United States Patent
Burk

Patent Number: 5,742,672
Date of Patent: Apr. 21, 1998

[54] INSTALLATION OF A MULTI-TERMINAL NETWORK

[76] Inventor: Peter Burk, 1st Floor Sunnyside Centre, 13 Frost Avenue, Sunnyside, Johannesburg, South Africa

[21] Appl. No.: 503,800

[22] Filed: Jul. 18, 1995

[30] Foreign Application Priority Data

| Jul. 19, 1994 | [ZA] | South Africa | 94/5269 |
| Apr. 12, 1995 | [ZA] | South Africa | 95/3015 |

[51] Int. Cl.⁶ .................................................. H04M 3/00
[52] U.S. Cl. .......................... 379/198; 379/112; 379/119; 379/201; 379/265; 395/600
[58] Field of Search ................................ 379/201, 207, 379/265, 100.01, 196, 29, 1, 27, 119, 135, 134, 112, 198; 455/33.1, 4.2; 340/825.79, 825.49; 395/600

[56] References Cited

U.S. PATENT DOCUMENTS

| 4,734,710 | 3/1988 | Sato et al. | 347/171 |
| 4,901,004 | 2/1990 | King | 324/66 |
| 4,916,444 | 4/1990 | King | 340/825.49 |
| 5,296,850 | 3/1994 | King | 340/825.49 |
| 5,309,509 | 5/1994 | Cocklin et al. | 379/207 |
| 5,353,339 | 10/1994 | Scobee | 379/207 |
| 5,416,833 | 5/1995 | Harper et al. | 379/201 |
| 5,491,742 | 2/1996 | Harper et al. | 379/201 |
| 5,515,037 | 5/1996 | Wise | 340/825.79 |
| 5,528,677 | 6/1996 | Butler et al. | 379/201 |
| 5,541,586 | 7/1996 | Wise | 340/825.79 |

*Primary Examiner*—Harry S. Hong
*Assistant Examiner*—Scott Wolinsky
*Attorney, Agent, or Firm*—Burns, Doane, Swecker & Mathis, L.L.P.

[57] ABSTRACT

A multi-terminal network such as a PABX system or a computer network is installed by compiling data corresponding to the location, identity and configuration of each terminal. An individual record containing the compiled data is generated for each terminal, preferably in the form of a sticker or label, and is located at the site of the relevant terminal. The network is then installed and configured according to the compiled data. To facilitate this, a software-based system is provided which includes a data input module, which typically runs on a PC at the site of the network, and a control module which runs on a computer at the premises of the service provider responsible for the network. Communication between the modules is provided for, to permit remote updating of the control module, and also to facilitate remote servicing of the network.

13 Claims, 4 Drawing Sheets

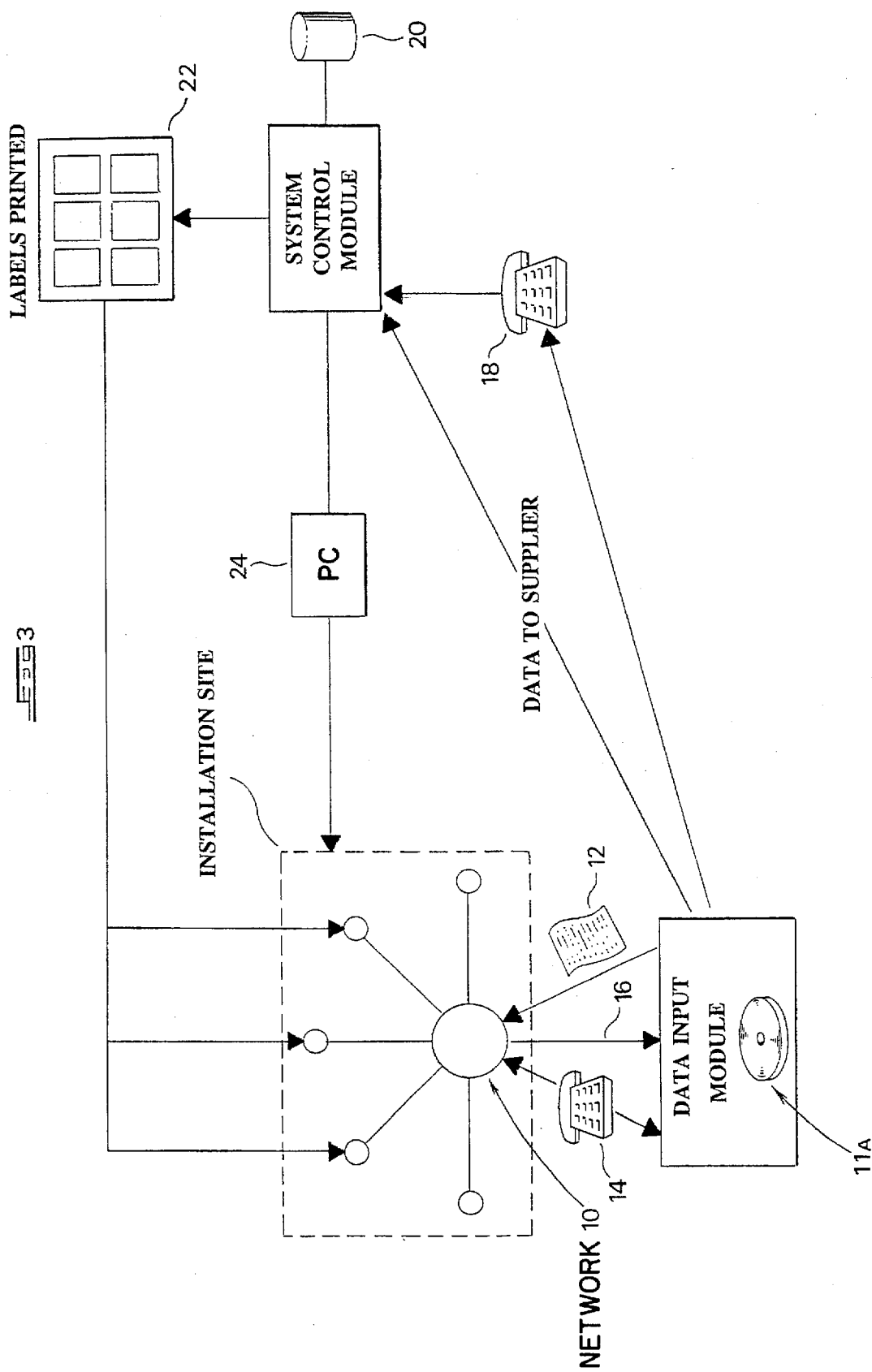

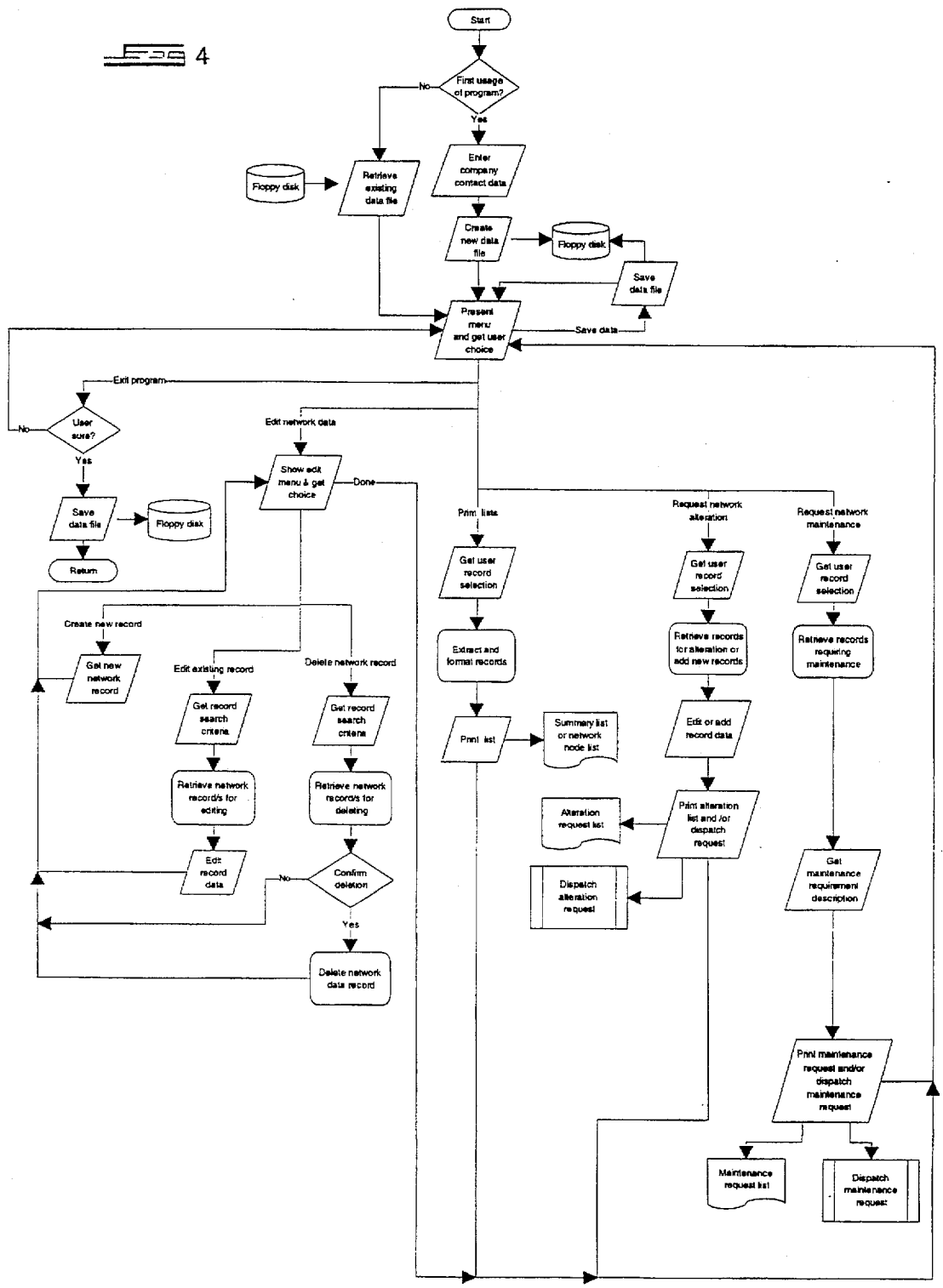
Data Input Module

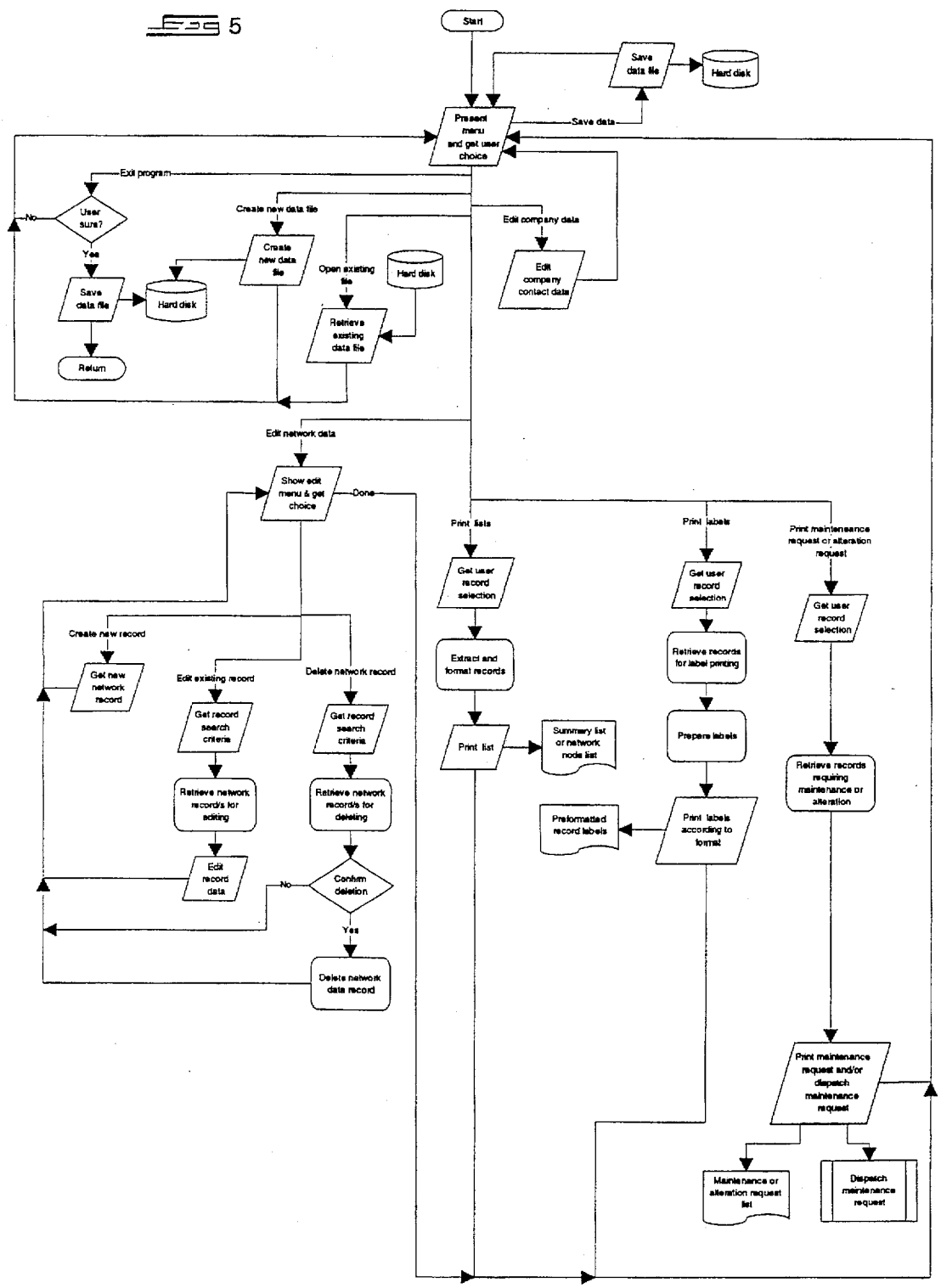

INSTALLATION OF A MULTI-TERMINAL NETWORK

BACKGROUND OF THE INVENTION

THIS invention relates to a method of and a system for installing a multi-terminal network such as a PABX telephone system or a computer network.

The installation of a PABX system or another multi-terminal network is time and labor intensive, and requires the installer and the client to co-operate in correctly locating and configuring each terminal of the network (whether they are telephone extensions or computer terminals) as required. In a typical situation, there may be a degree of confusion as to the client's requirements, particularly in the case of large companies where various individuals may give conflicting instructions or change their minds.

SUMMARY OF THE INVENTION

According to the invention a method of installing a multi-terminal network comprises:

compiling data relating to at least the location, identity and configuration of each terminal;

generating individual records containing the compiled data for each terminal;

locating the respective records at the intended location of each terminal; and installing and configuring the individual terminals according to the data of each respective record.

The network may be a PABX system, with the terminals being individual telephone units connected to a central exchange unit, for example.

By way of another example, the network may be a computer network with the terminals being personal computers or the like, connected to a central file server.

The method may include the step of periodically updating or maintaining the network.

In the case of a PABX system, the data which is compiled may include one or more of the following: the extension number, the date of installation, the date of any change or update, the type of telephone installed, the length of cord installed, the color code of the wiring, and any trunk barring level which applies, amongst others.

The individual records may comprise printed labels or stickers which can be attached to a wall or other surface adjacent a telephone jack or other terminal connection point, for easy reference, as well as summaries or lists of the terminals.

The invention extends to a system for installing a multi-terminal network comprising:

a data input module for receiving data relating to at least the location, identity and configuration of each terminal;

a control module remote from the data input module for receiving and compiling the data from the data input module; and record generating means for generating, in discernable format, individual records containing the compiled data.

The record generating means may be incorporated in both the data input module and the control module.

The term "installing" is to be understood as incorporating the original installation of a network, as well as the periodic maintaining, modifying and updating of the network.

BRIEF DESCRIPTION OF THE DRAWINGS

FIG. 3 shows a more detailed diagram illustrating a method of and apparatus for installing a multi-terminal network;

FIG. 4 is a flow chart of a data input module of a system according to the invention; and FIG. 5 is a flow chart of a system control module of the system.

DESCRIPTION OF EMBODIMENTS

Figures 1, 2:
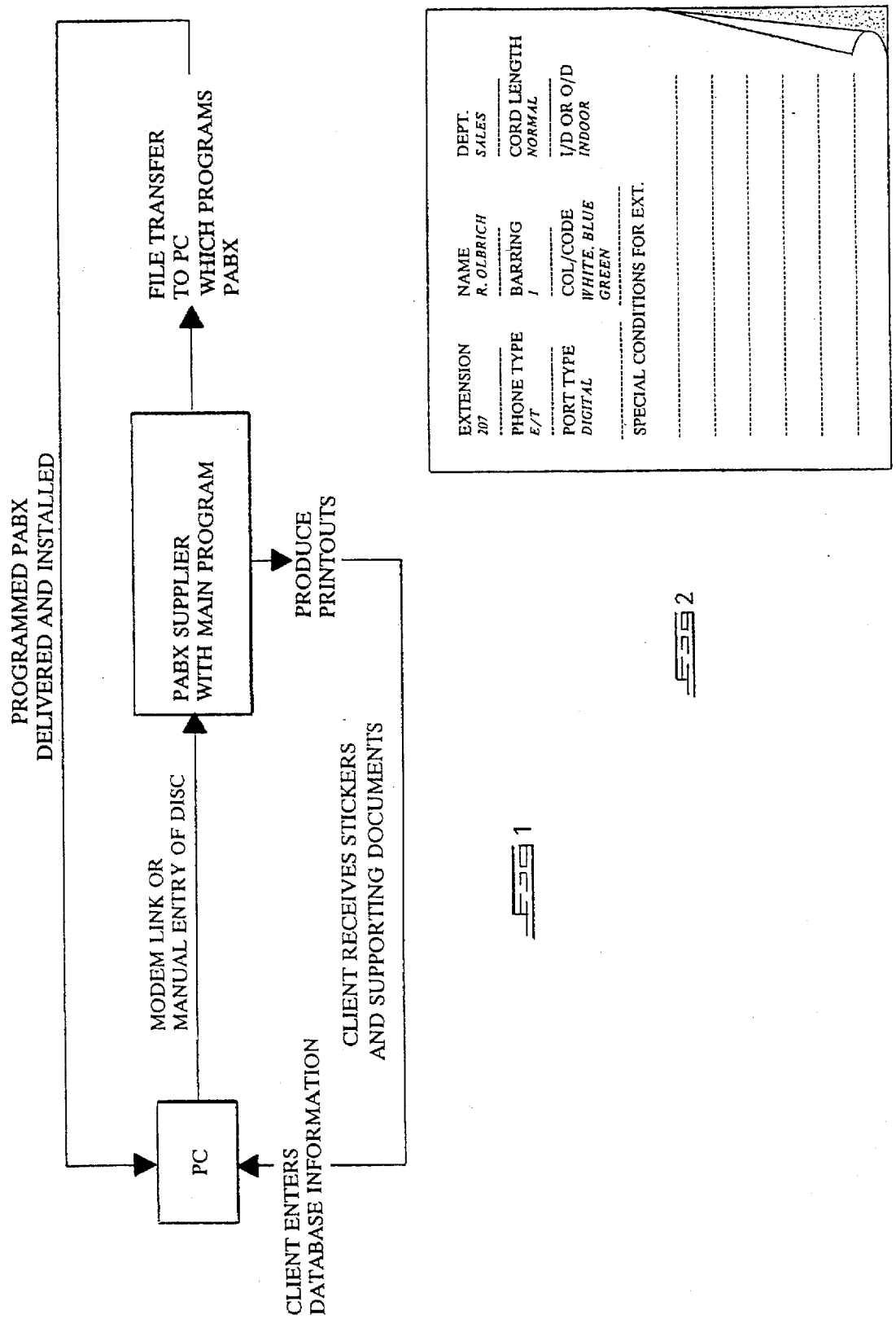
FIG. 1 is a simplified diagram illustrating a method of installing a multi-terminal network according to the invention.
FIG. 2 shows a typical record generated by the method.

The purpose of the invention is to streamline the procedure involved in installing modifying and maintaining a multi-terminal network, typically a PABX telephone system with multiple extensions or a computer network with multiple terminals. This is done by compiling the data necessary to locate, identify and configure each terminal in an organized manner, typically using a computer program, and then generating individual records in the form of labels or stickers which are placed at the intended location of each terminal and which can be referred to both when installing the terminals and in future. To facilitate the capturing and compiling of the relevant data, the end user is provided with a software package, usually on a stiffy or floppy disk, which prompts the user to enter the relevant data required to carry out the installation.

In the case of small installations, it may be more time and cost effective for the installer to record the information. However, in the case of the majority of installations, the time spent on the installation by the installer can be reduced dramatically if the end user of the equipment who is typically a client or customer, enters the information directly onto the computer diskette provided. A copy of the information is sent to a main program by making a copy of the diskette or by modem. The main program will typically be run by the supplier, or in the case of a large company, the head office or administration center. At the same time, the end user's involvement reduces the likelihood of errors being made or changes being required later.

The supplier or head office will have a more sophisticated version of the software which will keep an ongoing record of the client's configuration and which sorts and formats the information and generates printed records which can conveniently be in the form of adhesive stickers, labels or cards (see FIG. 2) on which the relevant details of the terminal are printed. These records are most preferably stuck to the wall or other surface adjacent to the required connection point for each terminal. This serves both to indicate to the installer where the connection point should be placed, and also provides a ready reference, when the terminal itself is connected, as to the type of terminal to be installed, the identity of the intended user and the various possible configurations of the terminal. The terminal itself can optionally have a duplicate record attached. In addition, the program can print a variety of schedules and summaries which will be used to check the installation and to print records which will be used to program the PABX.

Typically, each record will include at least some of the following information: extension number, name of user, department (and section in the case of a large company), type of telephone, type of terminal, barring level (if any), access level or priority in the network, length of telephone cord, type of port required in PABX (i.e. digital or analogue), color coding of extension wire, type of computer connection required, indoor/outdoor extension and date of completion of the installation. There is also room on the sticker for additional information specific to the terminal in question. For example, the client may want to use a specific telephone set, such as a hands-free unit, which it already has, for use in a boardroom or another specific location.

Apart from the basic stickers illustrated in FIG. 2, additional stickers for special or unusual terminal lines can be generated or for terminals with a specific function. Add-on stickers can also be generated, which add additional categories of information to original stickers with limited information thereon. It will be appreciated that the information will vary according to requirements or the type of installation, but will always include data relating to at least the location, identity and configuration of each terminal.

Apart from generating records as described above, the computer software also has the option of interacting with a microprocessor controlled PABX to automatically program the PABX itself according to the various requirements entered by the installer or the client, thereby obviating the need for manual extension-by-extension programming. This saves a great deal of time. Also, since the client has provided the information, the room for dispute between the client and the installer is greatly reduced.

It will be appreciated that the described method is entirely compatible with conventional installation methods, but serves to organize and facilitate the installation process. The existence of a decentralized record for each extension also facilitates ongoing maintenance modification and upkeep of the system.

Even long after the installation is completed, users of the equipment installed can readily check the status of each terminal and provide the necessary technical information when logging service calls. Equally, the job of technicians who are required to service the installation is facilitated, since a readily available record of the extension configuration exists at the relevant location.

In the case of large installations, the record-generating software can be supplied to the end user, who can update the information on the system and generate new stickers from time to time, as terminals are moved or reconfigured. The diskettes that capture the information are supplied to department heads or the like within the large organization.

When maintenance calls are placed with the service provider, the record-generating software supplied to the end user can be used to place such maintenance or service calls or to order additional equipment. Using the disc he or she has been provided with, the end user of the equipment is able to log or to look up a call, to perform a particular search for a terminal or extension number or to fix a fault such as a "dead line" fault in the case of a PABX system. Suitable hints or instructions from the supplier are generated in response to certain fields being entered into, such as a warning as to when the warranty expires or an explanation that the type of fault is not a product-related fault, but is due to an exchange line fault or the like. The customer then fills in an appropriate form detailing the additional equipment required or the service call that needs to be placed.

As an alternative, the supplier or service provider may receive this information directly by computer modem. The information can be manipulated and forwarded on to a technician with a hand-held terminal via a cellular or pager network.

The technical support department of a service provider may be provided with PC's incorporating the customer's details in a technical support program which has additional fields of benefit to technicians, such as the color coding of the network for facilitating wiring.

In one scenario, the client has just finalized the new network configuration when the technician arrives on site. The technician downloads the new network configuration, a print-out listing the changes is generated and the client then authorizes these changes. Clearly defined parameters are thus created, with little room for error.

As a further example, on receiving a service call from a client, a technician looks up the client's particular network configuration and realises that the fault has arisen as a result of a preset parameter, such as barring. Alternatively, the technician may realize that a simple modification can be performed by an extension user on a PABX to solve the problem of calls diverting to the wrong operator console. In both of the above cases, it will generally not be necessary for the technician to come to the customer's premises, and it will be possible for the technician to explain to the customer how to rectify the problem.

In FIG. 3, a schematic diagram of the system described above is illustrated. A data input module is located at the site of the user, which is initially the installation site, and a system control module is located at the site of the installer and service provider. Both modules comprise software which runs on a personal computer (PC) or another microprocessor based device. Data relating both to a computer network and a PABX network, both of which are illustrated schematically at 10, is entered onto the data input module which includes a stiffy or floppy disc 11A. The data is transferred to the system control module using any data transfer medium of the type described above.

The data input module is used to print speed dial lists, extension lists and other summaries 12 which are used for various verification processes as may be required. The data input module is also used to receive service calls 14 from the installation site, together with additional data 16 in the event of the local configuration of the network 10 being altered. Maintenance calls and the ordering of additional equipment 18 are also initiated via the data input module. The three main options of the data input module are thus the placing of a service call or the ordering of additional equipment, the entering and/or printing of data for the PABX and the entering and/or printing of data for the computer network.

The operation of data input module is illustrated in detail in the flow chart of FIG. 4.

The system control module runs on a hard drive 20 within which a master list of all the updated information supplied by the data input modules is stored. The system control module is typically supplied to a PABX or a computer network supplier, who in turn provides the various data input modules to its clients. In the case of a large company, the system control module can be supplied to a network co-ordinator instead of to an outside agency. FIG. 5 shows the operation of the system control module in detail.

All data received at the system control module via the various data input modules is used to print labels 22, together with summaries or lists on a departmental basis. As was described earlier on in the specification, these labels, lists and summaries are then returned to the client and the stickers are located at the particular terminal connection which is to be cabled.

The system control module has the option of programming the multi-terminal network 10. In addition, information relating to the network 10 and any maintenance-related data can be downloaded into the technician's portable PC 24 for ongoing maintenance.

In a large organization, an internal system control module can be provided, in which case each department would be supplied with a data input module.

I claim:

1. A method of installing a multi-terminal network comprising the steps of:
   A) generating a plurality of predetermined prompts which prompt a user to enter relevant data relating to at least a location, identity and configuration of each terminal in the network;
   B) compiling and storing the entered data corresponding to each terminal;
   C) generating individual records containing the compiled data for each terminal;
   D) locating the respective records at the intended location of each terminal; and
   E) installing and configuring the individual terminals according to the data of each respective record.

2. A method according to claim 1 wherein step D is performed by an intended user of the terminal.

3. A method according to claim 2, wherein the data which is compiled includes at least one of the following: the extension number, the date of installation, the date of any change or update, the type of telephone installed, the length of cord installed, the color code of the wiring, and any trunk barring level which applies.

4. A method according to claim 1, wherein the network is a computer network with the terminals being personal computers or the like, connected to a central file server.

5. A method according to claim 1 including the step of periodically updating or maintaining the network.

6. A method according to claim 1, wherein the individual records comprise printed labels or stickers which are attached to a wall or other surface adjacent a telephone jack or other terminal connection point, for easy reference.

7. A method according to claim 1 including storing data corresponding to the data contained in a plurality of the individual records in a central data storage means.

8. A method according to claim 7, wherein the configuring of the individual terminals is carried out at least partially by a microprocessor, utilizing the data compiled for each terminal.

9. A system for installing a multi-terminal network comprising:
   a data input module comprising a software-controlled processor located at a site of the multi-terminal network for receiving data relating to at least a location, identity and configuration of each terminal in the network;
   a control module remote from the data input module for receiving, compiling and storing the data from the data input module; and
   record generating means for generating, in a discernable format, individual records containing the compiled data for each terminal.

10. A system according to claim 9, wherein the control module comprises a software-controlled processor located at the site of a service provider responsible for the network.

11. A system according to claim 9, wherein the record generating means comprises printing means for generating labels or stickers on which data for each terminal is printed.

12. A system according to claim 9, wherein both the data input module and control module include data transfer means for transferring data between the modules.

13. A system according to claim 12, wherein the data input module receives data from a user of the network corresponding to desired changes to the network configuration and transmits the data to the control module, the control module generating a record for use in changing the network configuration.

* * * * *